(12) United States Patent
Kielpinski et al.

(10) Patent No.: US 10,288,811 B1
(45) Date of Patent: May 14, 2019

(54) OPTICAL SWITCHING BETWEEN WAVEGUIDES BY ADJACENT RESONANT STRUCTURE COUPLING

(71) Applicant: Hewlett Packard Enterprise Development LP, Houston, TX (US)

(72) Inventors: David Kielpinski, Palo Alto, CA (US); Shuren Hu, Palo Alto, CA (US); Mir Ashkan Seyedi, Palo Alto, CA (US); Thomas Van Vaerenbergh, Palo Alto, CA (US); Gabriel Joel Mendoza, Palo Alto, CA (US); Jason Pelc, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/831,733

(22) Filed: Dec. 5, 2017

(51) Int. Cl.
G02B 6/293 (2006.01)

(52) U.S. Cl.
CPC ..... *G02B 6/29338* (2013.01); *G02B 6/29343* (2013.01); *G02B 6/29395* (2013.01)

(58) Field of Classification Search
CPC ............ G02B 6/29338; G02B 6/29343; G02B 6/29395
USPC ............................ 385/1–3, 31–32, 39–40, 51
See application file for complete search history.

(56) References Cited

U.S. PATENT DOCUMENTS

| | | | |
|---|---|---|---|
| 7,496,253 B2 * | 2/2009 | Chang | G02B 6/12007 385/24 |
| 7,738,527 B2 | 6/2010 | He | |
| 7,965,914 B2 | 6/2011 | Xu et al. | |
| 2001/0004411 A1 | 6/2001 | Yariv | |

(Continued)

FOREIGN PATENT DOCUMENTS

| | | |
|---|---|---|
| CN | 101866066 | 10/2010 |
| CN | 102540345 | 7/2012 |

(Continued)

OTHER PUBLICATIONS

Zhou, L. et al.; "Wavelength-selective Switching Using Double Ring Resonators Coupled by a Three-waveguide Directional Coupler," May 13, 2015, 11 pages.

(Continued)

*Primary Examiner* — Michael P Mooney
(74) *Attorney, Agent, or Firm* — Hewlett Packard Enterprise Patent Department

(57) ABSTRACT

Examples described herein relate to an optical switching device wherein a racetrack resonant structure is positioned to determine a frequency passband by coupling. In some examples, a first waveguide receives an input light signal. A second waveguide is positioned to enable the input light signal to couple between the first waveguide and the second waveguide through a first coupling gap. The racetrack resonant structure is positioned adjacent to the first coupling gap to enable the input light signal to couple between one of the first waveguide and the second waveguide and the racetrack resonant structure through a second coupling gap.

(Continued)

Thus, the racetrack resonant structure is to determine the frequency passband such that a first portion of the input light signal that coincides with the frequency passband is output by the first waveguide, and a second portion of the input light signal that does not coincide with the frequency passband is output by the second waveguide.

14 Claims, 13 Drawing Sheets

(56) References Cited

U.S. PATENT DOCUMENTS

| | | |
|---|---|---|
| 2006/0023997 A1 | 2/2006 | Almeida et al. |
| 2012/0045163 A1* | 2/2012 | Wu .................. G02F 1/225 385/2 |
| 2012/0051750 A1* | 3/2012 | Yano ............... H04J 14/0221 398/91 |
| 2017/0017039 A1 | 1/2017 | Tu et al. |

FOREIGN PATENT DOCUMENTS

| | | |
|---|---|---|
| JP | 4537218 B2 | 9/2010 |
| KR | 10-2013-0141850 A | 12/2013 |

OTHER PUBLICATIONS

International Search Report and Written Opinion received for PCT Patent Application No. PCT/US2018/064101, dated Mar. 20, 2019, 9 pages.

\* cited by examiner

OPTICAL SWITCHING BETWEEN WAVEGUIDES BY ADJACENT RESONANT STRUCTURE COUPLING

STATEMENT OF GOVERNMENT INTEREST

The invention described herein was developed with government support under Grant Contract Number N66001-12-2-4007 as issued by the United States Defense Advanced Research Projects Agency (DARPA). The government has certain rights in the invention.

BACKGROUND

Switching of optical signals may have significant roles to facilitate in network infrastructure, including at datacenter scale and above. Optical or light signals may transmit via waveguides that guide propagation of a signal. Some optical networks may join multiple light signals of different wavelengths for transmission along the same waveguide, such as for example in wavelength-division multiplexing (WDM). Yet the multiple light signals may not share the same network destination. Thus, optical switching may occur when a network switches some selected light signals, such as of particular wavelengths, to another waveguide, such as to a different destination. Optical switching may be performed by conversion of light signals to electrical format for passage through an electronic switch, with later reconversion to optical format. In contrast, some all-optical switch technologies may enable all-optical switching designs, without conversion. An all-optical switch may allow for all data signals to remain purely optical. Nevertheless, such a switch design may allow for electronic controls, such as in its configurations or parameters.

BRIEF DESCRIPTION OF THE DRAWINGS

Certain examples are described in the following detailed description with reference to the drawings, of which.

DETAILED DESCRIPTION

Figure 1:
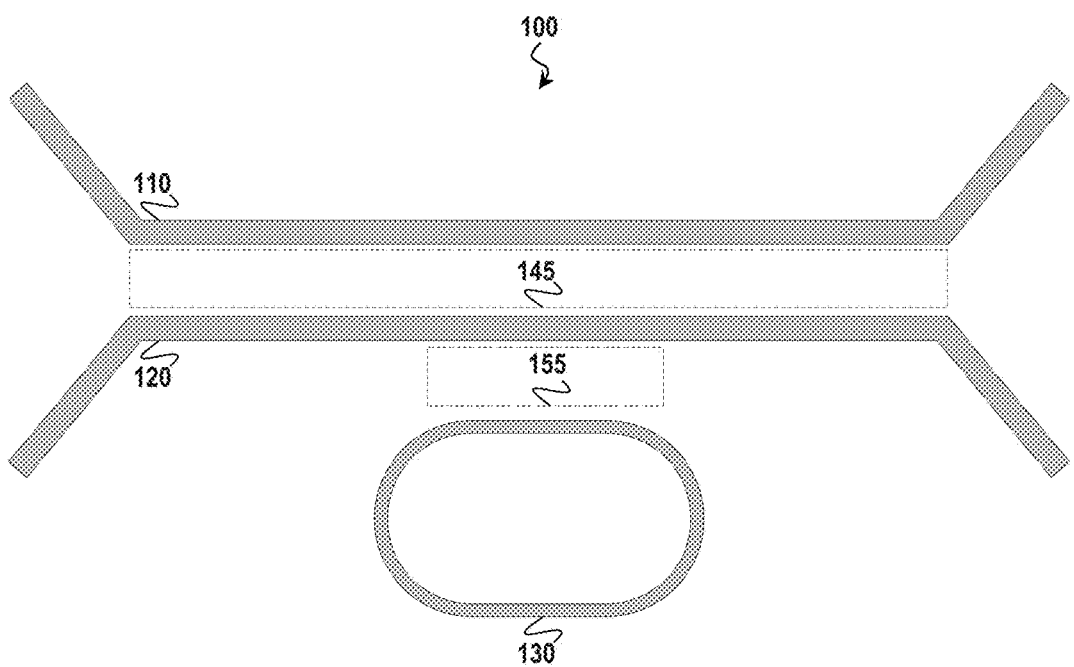
FIG. 1 is a block diagram of an optical switching device, according to some examples of the present disclosure.

Examples of the present disclosure relate to a device, system, and method for optical switching by adjacent resonant structure coupling. Such optical switching design may perform all-optical switching with low loss and enable efficient switch topologies for optical switches, including for designs of high-radix switching systems. All-optical switching may refer to optical switching wherein data signals remain in purely optical form. Thus, all-optical switching technologies may allow switching without conversion of optical signals, in contrast for example to optoelectronic switching using an electronic switch. Nevertheless, all-optical switching may still implement or accommodate for suitable control mechanisms or processes. In particular, embodiments of the present disclosure present a design for low-loss all-optical switching, including electronic control mechanisms to enable dynamic parameter controls in operation. Based on such design, some embodiments may implement a switching system that includes a set of racetrack resonant structures for efficient high-radix switching. Some embodiments may include a design with modifications to either of a waveguide width or a coupling gap width, thereby enabling control over switch design characteristics or relevant operating parameters.

In general, optical switching may play a significant role in a modern network infrastructure. While optical switching may be implemented with various different electronic switches via conversion, an all-optical switching design may be desirable to avoid significant costs imposed by such conversions, including in energy use and network latency. Similarly, while all-optical switching may be attempted through various different all-optical switching technologies without conversion costs, such respective designs for an all-optical switch may likewise impose various yet significant costs, undesirable constraints, or inefficiencies, for example in slow reconfiguration times, high transmission losses, or high circuit complexities. For example, designs based on micro-electro-mechanical systems (MEMS) may operate with reconfiguration times on the order of hundreds of milliseconds, which may be too slow for various practical uses. Similarly, designs based on signal transmission through one or more microring resonators including electronic controls may suffer signal losses of 2-3 decibels (dB) per microring, resulting overall in either of high losses or high power usage for tuning per microring. Finally, designs based on wavelength redirection such as by arrayed gratings may need laser sources of tuning precisions that remain impractical or otherwise unavailable. Such costs, constraints, or inefficiencies of a particular switch design may grow particularly unmanageable in construction of an expanded or high-radix system for all-optical switching.

Thus, it may be desirable to develop a low-loss and expandable all-optical switch design, of a switch topology more suitable to construct an efficient, high-radix optical switching system.

In examples of the present disclosure, an optical switching device includes a first waveguide, a second waveguide, and a racetrack resonant structure. A waveguide may refer to any structure suitable to guide or direct a light signal. A racetrack resonant structure may refer to any waveguide arranged in a closed-loop shape, including various microring resonators. Thus, the first waveguide may be positioned to receive an input light signal. The second waveguide may be positioned to enable the input light signal to couple between the first waveguide and the second waveguide through a first coupling gap. The first and second waveguides may thereby design, implement, and/or function as a directional coupler. The first coupling gap may have a particular design, such as in its length and in its width with respect to the first and second waveguides that characterize it. In particular, the first coupling gap may be designed such that any input light signal that is received by the first waveguide tends to exit from the first coupling gap by the second waveguide, e.g. in a "cross" state, as opposed to by the first waveguide, e.g. in a "bar" state. Thus, any light signal input to the first coupling gap may tend to exit in a cross state, based on the particular design as described.

In such examples, the racetrack resonant structure may be positioned adjacent to the first coupling gap. The racetrack resonant structure may allow select input light signals to couple between one of the first and second waveguides and the racetrack resonant structure through a second coupling gap. Thus, the racetrack resonant structure may be positioned adjacent to the directional coupler to allow for coupling between the first and second coupling gaps within the device, i.e. prior to exit of the input light signal from the first coupling gap. The second coupling gap may then have a particular design, such as in its length and width, with respect to the first coupling gap. In particular, the second coupling gap may be designed such that the racetrack resonant structure is over-coupled to the respective waveguide, e.g. designed with a width such that losses due to coupling is small or negligible compared to the coupled power. Furthermore, the second coupling gap may be designed such that its length is suitably or substantially shorter than the length of the first coupling gap. In summary, such a particular design of the second coupling gap and its positioning adjacent to the first coupling gap may therein allow any input light signal selected to couple over the second coupling gap to "undo", "reverse", or otherwise modify the coupling effect over the first coupling gap. For example, an input light signal that couples over the second coupling gap may then exit the first coupling gap by the first waveguide, e.g. as output in the bar state, not in the cross state by which it might have exited otherwise. The device may thus perform all-optical switching.

In some such examples, the racetrack resonant structure may be positioned symmetrically with respect to the first coupling gap, such that the second coupling gap may be positioned symmetrically with respect to the length of the first coupling gap. However, as explained in further detail below, various examples may implement suitable designs with relative flexibility in positioning of the racetrack resonant structure or the second coupling gap, e.g. adjacent to the first coupling gap and without a particular limitation of symmetry. In general, a symmetrical position may facilitate switching for the device, by symmetrically undoing the coupling effect over the length of the first coupling gap with respect to a first half of its length and a second half of its length. Suitable designs may nevertheless enable the second coupling gap to "undo", "reverse", or otherwise modify the coupling over the first coupling gap without an exact symmetry in positioning. In general, the racetrack resonant structure may thus determine a "frequency passband" for the device in performing switching of output between the two waveguides, as all input signals may tend to couple over the first coupling gap similarly, such that undoing or modifying the coupling effect switches output. In some such examples, for any input light signal, a first portion of the signal that coincides with the frequency passband may exit by the input waveguide, e.g. output in the bar state, and a second portion of the signal that does not coincide with the frequency passband may exit by the adjacent waveguide, e.g. output in the cross state. In some cases, either of the portions may be null, e.g. an input signal may also be switched in its entirety or in no portion.

As used herein, the terms "coupling" or "optical coupling" may be understood to refer more generally to evanescent wave coupling as a phenomena of transfer, division, or distribution of energy or power for a light signal over a coupling gap under certain conditions. An input light signal propagating in a first waveguide may tend to develop an evanescent wave in a second waveguide when the second waveguide is positioned sufficiently nearby or adjacent to the first waveguide, as in a suitable directional coupler. The input light signal in the first waveguide may then "couple over" the first coupling gap or "couple between" the first and second waveguides throughout a length of the first coupling gap. The input light signal may then exit from the length of the first coupling gap with a first portion of power or energy still propagating in the first waveguide and a second portion "coupled into" the second waveguide for propagation therein. As noted above, the first coupling gap may have such a particular design that the input light signals may "couple entirely" into the second waveguide, such that all or relatively all of the energy or power tends to exit by the second waveguide and continues to propagate in the second waveguide, e.g. as output in a cross state. The first coupling gap may be designed, as in its length and width, to couple all input light signals, of any wavelength or frequency. Similarly, it may tend to output all signals in the cross state.

With respect to the second coupling gap, however, coupling to or between the racetrack resonant structure may be designed to select for a frequency passband, as noted. In general, a racetrack resonant structure may exhibit a resonance at a resonant wavelength, based upon its closed-loop structure. In particular, an input light signal propagating along the first coupling gap that does not coincide with the resonant wavelength may continue to propagate unimpeded along the length of the first coupling gap, so as to exit by the second waveguide, e.g. in the cross state as noted. In contrast, an input light signal that coincides with the resonant wavelength may develop an evanescent wave in the racetrack resonant structure and couple into the racetrack resonant structure while propagating along the length of the first coupling gap. More generally, the racetrack resonant structure may determine a frequency passband with a passband width that may be based on a central frequency. The central frequency may at be the resonant wavelength. Thus, the racetrack resonant structure may operate as a notch filter with respect to the frequency passband. Likewise for any input light signal, a first portion of the signal may couple to the racetrack resonant structure, while a second portion of the signal may continue propagating unimpeded. In operation as a notch filter over the second coupling gap, the racetrack resonant structure may characterize a signal transfer function for output by the switching device, as further described below. In particular, the racetrack resonant structure may thereby "switch" the output of the frequency passband as between the two waveguides, e.g. from the directional coupler over the first coupling gap.

In coupling based on resonance, the racetrack resonant structure may impose a phase shift of pi (0r) on the frequency passband as it propagates along the first coupling gap. As noted, the design of the device may position the racetrack resonant structure suitably, for example symmetrically with respect to the first coupling gap, such that the phase shift by the second coupling gap may operate effectively to "undo", "reverse", or otherwise modify the coupling over the first coupling gap for that portion of the input light signal. Specifically, the coupling along the prior length of the first coupling gap, e.g. that preceding the second coupling gap, may be modified by the coupling along the later length of the first coupling gap, e.g. that following the second coupling gap. Based on the imposed phase shift, the first portion of the input light signal that coincides with the frequency passband may thereafter continue in propagating along the first coupling gap but then exit instead by the first waveguide (output in bar state), rather than by the second waveguide (output in cross state). In contrast, the second portion of the input light signal that does not coincide with the frequency passband may continue to propagate unimpeded and thus continue to exit the first coupling gap by the second waveguide (output in cross state). Notably, such a design allows input signals to transmit through the two waveguides as in a directional coupler, not directly through the racetrack resonant structure as for example in switch designs that may implement a resonant coupling in series between waveguides for input and output. Rather, the racetrack resonant structure may merely apply a phase shift on a select frequency passband via resonant coupling. Thus, the optical switching device may perform all-optical switching with low insertion loss, based on the signal power remaining within the two waveguides. The racetrack resonant structure may also determine, select, or control the frequency passband dynamically.

Examples of the present disclosure may implement suitable control mechanisms, including electronic controls for such a switching device as described in the above. Characteristics or parameters of switching may therefore be rapidly reconfigurable during operation of the device, for example on the order of picoseconds (ps). The resonant wavelength of a racetrack resonant structure may be tuned or modified, for example, by changing an effective refractive index of the racetrack resonant structure. Changing the voltage or the temperature of a portion of the racetrack resonant structure may result in a changing of the effective refractive index. In several examples of the present disclosure, an electronic control mechanism may thus modify a voltage or a temperature of the racetrack resonant structure, to tune the resonant wavelength and/or to control the frequency passband with respect to switching by the device. Additionally, other parameters of the signal transfer function of the switching device, such as edge steepness and tail or dispersive characteristics of the frequency passband, may be adjusted by modifying the racetrack resonant structure.

Examples of the present disclosure may expand on designs as described in the above in construction of more efficient high-radix systems that include electronic controls. In particular, switching designs or topologies as described in the above may allow expansions that include additional waveguides and/or racetrack resonant structures arranged similarly or otherwise suitably relative to a first coupling gap as described in the above. Each racetrack resonant structure may thus determine a respective or distinct passband, based on a respective or distinct resonant wavelength. Each racetrack resonant structure may also correspond to an electronic control mechanism to tune or modify its passband, allowing for dynamic switching control during system operation. For example, a 128-radix switch may be constructed with less than about 1000 switching elements. Finally, characteristics of switching in such systems may be modified further with switch designs incorporating one or more modifications in the dimensions of any or all of the waveguides, the second coupling gap, or the first coupling gap. For example, a system may include a region of modified width for the first coupling gap, including to facilitate suitable positioning for additional racetrack resonant structures. For example, a system may include a region of modified width for one of the waveguides, including to characterize the frequency passband of the switching system. Thus such systems as described in the above may perform efficient, high-radix, all-optical switching with rapidly reconfigurable electronic controls, wherein the design or topology may allow for expansions or several variations on the switching designs and/or the characteristics of the switching. In these ways and others, the examples described herein may materially improve performance of a method, device, or system for optical switching, and of all-optical switching in particular.

The examples of the present disclosure are hereafter described with reference to the following figures. Unless noted otherwise, the figures and accompanying descriptions are non-limiting, such that no element is either exclusive to or characteristic of any particular example. Accordingly, features from one example may be freely incorporated into any other examples without departing from the spirit and scope of the content in the present disclosure.

An optical switching device for use with the present disclosure is described with reference to FIG. 1. In that regard, FIG. 1 is a block diagram of an optical switching device 100, according to some examples of the present disclosure. The optical switching device 100 includes a first waveguide 110, a second waveguide 120, and a racetrack resonant structure 130. The first waveguide 110 is positioned to receive an input light signal. The second waveguide 120 is positioned to enable the input light signal to couple between the first waveguide 110 and the second waveguide 120 through a first coupling gap 145. The racetrack resonant structure 130 is positioned adjacent to the first coupling gap 145 to enable the input light signal to couple between one of the first waveguide 110 and the second waveguide 120 and the racetrack resonant structure 130 through a second coupling gap 155. As illustrated in FIG. 1, the racetrack resonant structure 130 is positioned adjacent to the second waveguide 120, while the device 100 may be understood to allow for the racetrack resonant structure 130 to be similarly positioned adjacent to the input or first waveguide 110, without limitation. Similarly, while the input light signal is discussed with reference to the first waveguide 110, the device 100 may be understood to allow for either or both waveguides 110, 120 to receive simultaneous, similar, or distinct input light signals, without limitation.

The first coupling gap 145 may be understood to be illustrative of the scope of a characteristic coupling region between the first waveguide 110 and the second waveguide 120, not as limiting design. The designs of the first waveguide 110 and the second waveguide 120 may determine the characteristics of the first coupling gap 145. In particular, the relative dimensions of the first coupling gap 145 are illustrative, without limiting a design parameter of the device 100. For purposes of characterization as discussed above, the first coupling gap 145 may be referred to as a continuous region with a particular length and a particular width, for example as represented in device 100 of FIG. 1 via illustrated rectangle. In several examples of the present disclosure, the first coupling gap 145 is designed to have a width and length such that all signals input to the device 100 tend to be output in a cross state, for example in absence of additional design elements such as racetrack resonant structure 130. Thus, any signal input by one of the waveguides 110, 120 may tend to couple entirely over to the other of the waveguides 120, 110 and tend to output by the other waveguide 120, 110.

The second coupling gap 155 may similarly be understood to be illustrative of the scope of a characteristic coupling region between one of the waveguides and the racetrack resonant structure 130, not as limiting design. The designs of the respective waveguide and the racetrack resonant structure 130 may determine the characteristics of the second coupling gap 155. Also for purposes of characterization, the second coupling gap 155 may be referred to as a continuous region with a particular length and a particular width, for example again as represented in device 100 of FIG. 1 via illustrated rectangle. The relative dimensions of the second coupling gap 155 are illustrative, again without limiting a particular design parameter of the device 100. In several examples of the present disclosure, the second coupling gap 155 is designed to have a width suitably narrow such that the racetrack resonant structure 130 is overcoupled to the respective waveguide, such that any coupling losses are insubstantial or negligible relative to the fraction of power coupled into or out of the racetrack resonant structure 130. In several examples of the present disclosure, the second coupling gap 155 is designed to have a shorter length relative to the length of the first coupling gap 155, as illustrated in FIG. 1 via the two relative rectangles. Designs of length and width may impact, vary, or characterize switching in the device 100. In particular, designs of the length and width for the second coupling gap may undo, reverse, or otherwise modify the coupling effect over the first coupling gap for a portion of an input signal. The portion of the input signal that is thus affected may be referred to as coinciding with a frequency passband. The frequency passband may characterize or result in a switching in the output of the device 100.

In some examples of the present disclosure, the second coupling gap 155 is designed or positioned symmetrically with respect to the first coupling gap 145, as illustrated in FIG. 1. However, the device 100 may also be understood to allow for designs that position the second coupling gap 155 adjacently to the length of the first coupling gap 145 in suitable non-symmetric variations, without limitation as to a particular design parameter of the device 100. Design variations may include modifications to any of the symmetries, shapes, widths, and/or spacings of the waveguides 110 and 120 and the racetrack resonant structure 130 of the device 100. Positioning, including of the second coupling gap 155 relative to the first coupling gap 145, may impact, vary, or characterize switching in the device 100.

In FIG. 1, the first waveguide 110 and the second waveguide 120 may thereby design, enable, or function as a directional coupler with respect to the first coupling gap 145, with input-output ratios of 1×1, 1×2, 2×1, and/or 2×2 with respect to waveguides 110, 120. In general, a directional coupler may refer to any structure suitable to allocate, to divide or otherwise to distribute signal power between input and output based on the properties of the coupler itself and/or the input signal, including for example as applied to light signals in wavelength-division multiplexing (WMD). In particular, either and/or both of waveguides 110, 120 may receive an input light signal that is coupled to the other waveguide 120, 110 over the first coupling gap 145. Any input signal may then be output by either and/or both of waveguides 120, 110, including in divided or distributed form, based on properties of the input signal and design of the first coupling gap 145. The waveguides 110, 120 may remain coupled continuously over the length of the first coupling gap 145. As noted above, such a directional coupler may produce output in a bar state, e.g. by the input waveguide, and/or a cross state, e.g. by the adjacent waveguide. The output may be in a combination with a first portion of the input signal output in bar state and a second portion of the input signal output in cross state. In several examples of the present disclosure, the first coupling gap 145 is designed, e.g. in length and width, such that the directional coupler as designed by the waveguides 110 and 120 tends to output in a cross state any or all signals input to the first coupling gap 145, for example in the absence of additional design elements of the device 100 such as the racetrack resonant structure 130. Thus, all signals that are input to the device 100 may undergo coupling over the first coupling gap 145 in a similar or comparable manner.

Racetrack resonant structure 130 may refer to a waveguide formed in a closed loop, such that it is suitable for resonance. In several examples of the present disclosure, the racetrack resonant structure 130 is a microring resonator. The racetrack resonant structure 130 may exhibit a resonance at a resonant wavelength. The racetrack resonant structure 130 may be positioned adjacent to the first coupling gap 145, as adjacent to one of the waveguides 110, 120 that constitute the directional coupler, such that a light signal propagating along the first coupling gap 145 may couple into the racetrack resonant structure 130 over the second coupling gap 155. The coupling over the second coupling gap 155 may occur for particular, selected, or otherwise controlled conditions. An input light signal propagating at a resonant wavelength along the first coupling gap 145 may tend to develop an evanescent wave in the racetrack resonant structure 130 by coupling. However, a light signal propagating at a non-resonant wavelength along the first coupling gap 145 may tend to continue to propagate unimpeded along the first coupling gap 145, with no coupling into the racetrack resonant structure 130. Thus, racetrack resonant frequency 130 may select for a particular frequency.

The racetrack resonant structure 130 may have a frequency passband that is centered on a central frequency. The central frequency may be at the resonant wavelength. Thus, the racetrack resonant structure 130 may design or operate as a notch filter, by allowing light signals outside of the frequency passband to continue to propagate unimpeded along the first coupling gap 145, while coupling light signals inside of the frequency passband into the racetrack resonant structure 130. The notch filter may be characterized by a signal transfer function. Note, however, that light signals inside of the passband that are coupled into the racetrack resonant structure 130 may also couple back over the second coupling gap 155 and continue to propagate along the first coupling gap 145, due to resonance. Thus, an overall characterization of a signal transfer function may depend upon the relative positioning of the second coupling gap 155 with respect to the first coupling gap 145. In several examples of the present disclosure, the racetrack resonant structure 130 is positioned to impose a phase shift of pi (0r) for the frequency passband. In some such examples, the design positions the racetrack resonant structure 130 symmetrically with respect to the first coupling gap 145, such that the second coupling gap 155 is positioned symmetrically, as is illustrated in FIG. 1. In such designs, coupling of the frequency passband over the second half of the length of the first coupling gap 145 may undo, reverse, or otherwise cancel the coupling over the first half of the length of the first coupling gap 145, based on the phase shift of pi (Or) for the frequency passband. Thus, the device 100 may produce output in a bar state for the frequency passband. In some examples, the phase shift otherwise modifies the output of the device 100. The signal transfer function may include dispersive or additional characteristics based on the phase shift.

The racetrack resonant structure 130 is thereby to determine a frequency passband, such that a first portion of the input light signal that coincides with the frequency passband is output by the first waveguide 110, and a second portion of the input light signal that does not coincide with the frequency passband is output by the second waveguide 120. In some examples of the present disclosure, either of the first portion or the second portion of an input light signal is a negligible or null portion, such as when an input light signal either coincides in entirety or else coincides in no portion with the determined frequency passband. The device 100 may thus perform all-optical switching with respect to a frequency passband.

While FIG. 1 illustrates the elements of the optical switching device 100 in an example design, configuration, or arrangement, it is understood that the illustrated elements of FIG. 1 may also be designed, configured, or arranged in several different variations of the optical switching device 100 without loss of generality according to the present disclosure. For example, while FIG. 1 illustrates the first waveguide 110 and the second waveguide 120 as similar or symmetric in dimensions, it may be understood that the first waveguide 110 and the second waveguide 120 may likewise be dissimilar, non-symmetric, or otherwise distinct in characteristics so long as the second waveguide 120 is suitably positioned to enable the coupling over the first coupling gap 145. Similarly, while FIG. 1 illustrates the racetrack resonant structure 130 as positioned adjacent to the second waveguide 120, it is understood that the racetrack resonant structure 130 may likewise be suitably positioned adjacent to the first waveguide 110, so long as the racetrack resonant structure 130 is suitably positioned adjacent to the first coupling gap 145 to enable the coupling over the second coupling gap 155. Finally, while FIG. 1 illustrates the first coupling gap 145 and the second coupling gap 155 as similar rectangles, it is understood that the first coupling gap 145 and the second coupling gap 155 may likewise be dissimilar, non-symmetric, or otherwise distinct in dimensionality or characteristics. As noted, in several examples of the present disclosure, the second coupling gap 155 is designed to have shorter length than the first coupling gap 145. The second coupling gap 155 may also be designed such that the racetrack resonant structure 130 is overcoupled to one of the waveguides 110, 120. Overcoupling may refer to coupling wherein a power loss due to coupling is small relative to a fraction of power coupled, such that any internal losses in the racetrack resonant structure 130 are relatively negligible. The racetrack resonant structure 130 may be overcoupled with respect to the second coupling gap 155 by positioning it sufficiently nearby to the respective adjacent waveguide 110, 120.

Figure 2:
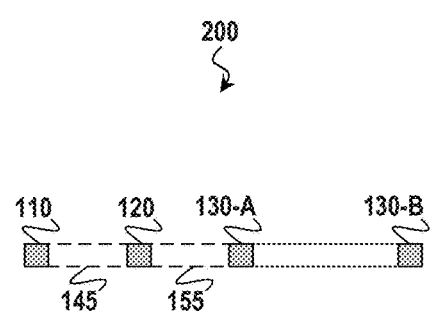
FIG. 2 is a block diagram of a planar cross-section of an optical switching device, according to some examples of the present disclosure.

Further examples are described in detail with reference to FIG. 2. In that regard, FIG. 2 is a block diagram of a planar cross-section of an optical switching device 200, according to some examples of the present disclosure. The optical switching device 200 may be substantially similar to the optical switching device 100 of FIG. 1. In particular, similarly numbered elements in FIG. 2 may be substantially similar to those of FIG. 1 as described above, including waveguides 110 and 120, racetrack resonant structure 130, the first coupling gap 145, and the second coupling gap 155. The elements of the device 200 may be positioned in the same plane and/or designed with a similar height dimensionality, including any or all of the waveguides 110, 120 and the racetrack resonant structure 130 of FIG. 1, as illustrated in FIG. 2. However, the device 200 may be understood to allow for non-planar or multi-planar designs without limitation, so long as the element positioning suitably enables the first coupling gap 145 and the second coupling gap 155, as described with reference to FIG. 1. In cross-section, FIG. 2 illustrates the second waveguide 120 to be positioned sufficiently nearby and adjacent to the first waveguide 110 to establish the first coupling gap 145 between them. In cross-section, FIG. 2 illustrates the racetrack resonant structure 130 of FIG. 1 as a near cross-section 130-A and far cross-section 130-B, with a dotted outline merely to denote closed-loop structure. The near cross-section 130-A is positioned sufficiently nearby to one of the waveguides 110, 120 to establish the second coupling gap 155 between them. Consistent with FIG. 1, FIG. 2 again illustrates the second coupling gap 155 as by the second waveguide 120, without limiting designs that may use the first waveguide 110 instead. In cross-section, FIG. 2 illustrates the second coupling gap 155 to be positioned sufficiently adjacent to the first coupling gap 145 to enable coupling between them. Thus, the first coupling gap 145 and the second coupling gap 155 may coincide along portion of the overall length of the device 200, including the cross-section that is illustrated in FIG. 2. However, as illustrated in FIG. 1, the second coupling gap 155 may also be designed to have a length that is shorter than the length of the first coupling gap 145.

Figure 3:
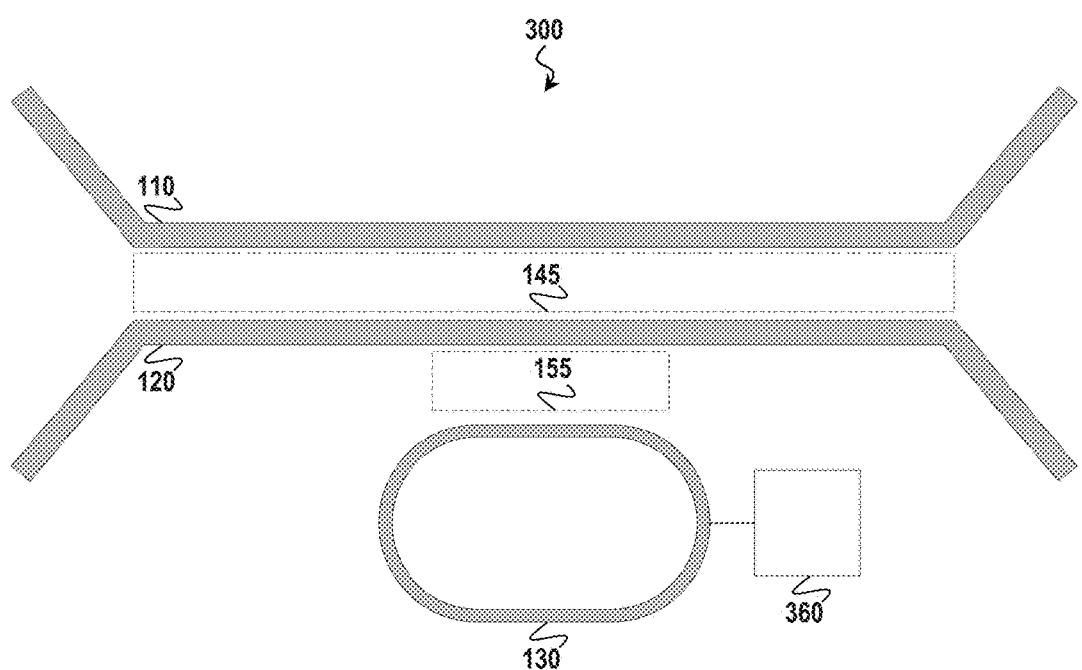
FIG. 3 is a block diagram of an optical switching device that includes a control mechanism, according to some examples of the present disclosure.

Further examples are described in detail with reference to FIG. 3. In that regard, FIG. 3 is a block diagram of an optical switching device 300 that includes a control mechanism 360, according to some examples of the present disclosure. The optical switching device 300 may be substantially similar to the optical switching device 100 of FIG. 1. In particular, similarly numbered elements may be substantially similar to those of FIG. 1, including the waveguides 110 and 120, the racetrack resonant structure 130, the first coupling gap 145, and the second coupling gap 155. In several examples of the present disclosure, the control mechanism 360 is an electronic control mechanism. The control mechanism 360 may apply a control process to vary a parameter of the racetrack resonant structure 130, such as a voltage or a temperature parameter. As noted above, such parameters may tune or vary the resonant wavelength or control the frequency passband of the device 300, for example by changing the effective refractive index of the racetrack resonant structure 130. The frequency passband may determine or affect switching characteristics of the device 300, such that the control mechanism 360 may enable rapid reconfiguration of switching parameters. Thus, switching by the device 300 may be reconfigurable on the order of picoseconds (ps). The control mechanism 360 may use, include, or implement control logic and/or digital logic in any combination of hardware and/or software designs, including complimentary metal-oxide semiconductor (CMOS) technology, integrated circuit (IC) or application-specific integrated circuit (ASIC) designs, a controller or microcontroller, or other suitable control technology that may vary, modify, or otherwise control a parameter of a racetrack resonant structure 130.

Figures 4A, 4B, 4C:
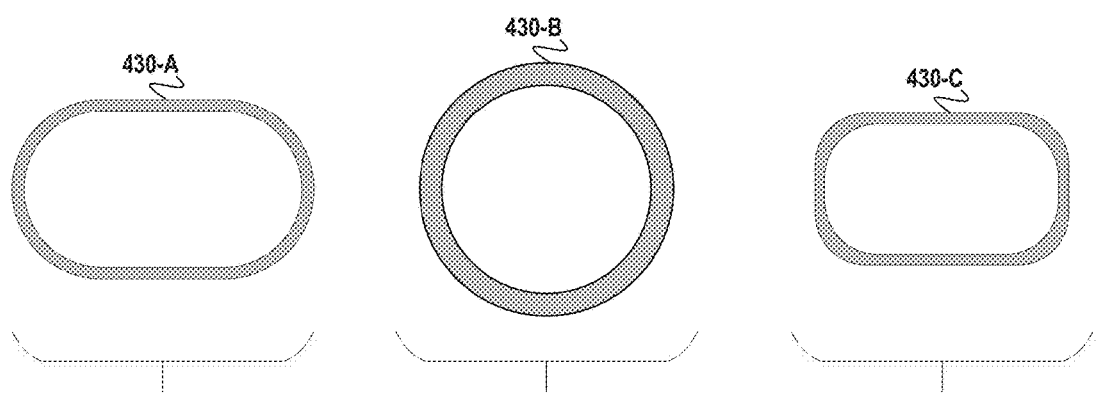
FIGS. 4A-4C are block diagrams of a racetrack resonant structure for use with an optical switching device, according to some examples of the present disclosure.

Further examples are described in detail with reference to FIGS. 4A-4C. In that regard, FIGS. 4A-4C are block diagrams of a racetrack resonant structure 430 for use with an optical switching device, according to some examples of the present disclosure. The racetrack resonant structures 430 may be used with any of the device 100 of FIG. 1, the device 200 of FIG. 2, the device 300 of FIG. 3, or with other suitable designs of comparable devices. The racetrack resonant structures 430 may be substantially similar to the racetrack resonant structure 130 of FIG. 1, as described above. As noted, the racetrack resonant structure 130 of FIG. 1 may refer to any suitable waveguide arranged in a closed loop form or structure, including various types of microring resonators. In that regard, FIG. 4A illustrates a racetrack resonant structure 430-A designed in the shape of an ellipse; FIG. 4B illustrates a racetrack resonant structure 430-B designed in the shape of a circle; and FIG. 4C illustrates a racetrack resonant structure 430-C designed in the shape of a rounded rectangle. Shapes are illustrated without limitation to designs, so long as a form design may enable suitable resonant coupling.

Figure 5:
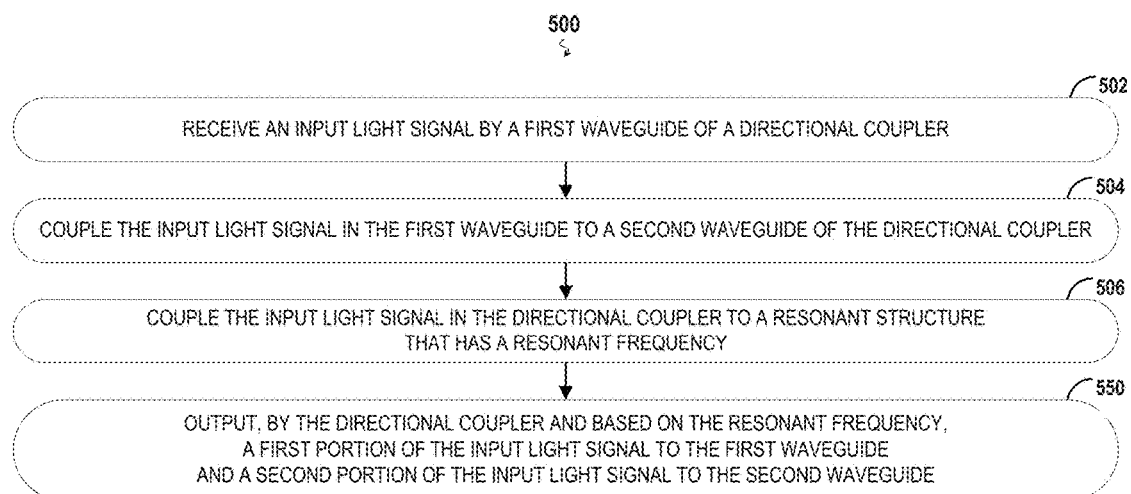
FIG. 5 is a flow diagram of a method of performing optical switching with an adjacent racetrack resonant structure, according to some examples of the present disclosure.

Further examples for implementing optical switching in accordance with the present disclosure are discussed in detail with reference to FIG. 5. In that regard, FIG. 5 is a flow diagram of a method 500 of performing optical switching with an adjacent racetrack resonant structure, according to some examples of the present disclosure. The description of method 500 may be understood to be non-limiting. Blocks may be added to or omitted from the method 500 without departing from the disclosure. Unless noted otherwise, blocks of the method 500 may be performed in any order, including concurrently by one or more device elements. In general, the method 500 may be equally suitable for performance by using the device 100 of FIG. 1, device 200 of FIG. 2, device 300 of FIG. 3, or any other suitable device. For purposes of clarity, the following may refer to the device 100 of FIG. 1 without limitation.

The method 500 may start in block 502 for a suitable optical switching device. In block 502, the device receives an input light signal by a first waveguide of a directional coupler. For an example referencing FIG. 1, the device 100 receives an input light signal by the first waveguide 110 of the directional coupler designed by the waveguides 110 and 120. In some such examples, the first waveguide 110 is positioned to receive the input light signal to device 100. In some such examples, the second waveguide 120 is positioned relative to the first waveguide 110 to design a directional coupler, including the first coupling gap 145. The device 100 may also receive similar or distinct input light signals by either of the first waveguide 110 or the second waveguide 120, including some simultaneously as noted earlier.

In block 504, the device couples the input light signal in the first waveguide to a second waveguide of the directional coupler. For an example referencing FIG. 1, the device 100 couples the input light signal in the first waveguide 110 to the second waveguide 120 of the directional wave coupler of waveguides 110 and 120, as the signal propagates lengthwise along the first coupling gap 145. In some such examples, the second waveguide 120 is positioned to enable the input light signal to couple between the first waveguide 110 and the second waveguide 120 through the first coupling gap 145. The device 100 may be designed thereby to couple an input light signal in its entirety, regardless of an eventual output state that may distinguish a first or second portion of signal, as discussed in FIG. 1. As noted earlier, the first coupling gap 145 may also be designed so as to tend to output any or all input signals in a cross state, or by the second waveguide 120 for input by the first waveguide 110, for example in absence of other design elements such as the racetrack resonant structure 130.

In block 506, the device couples the input light signal in the directional coupler to a resonant structure that has a resonant frequency. For an example referencing FIG. 1, the device 100 couples the input light signal in the directional coupler of waveguides 110 and 120 to the racetrack resonant structure 130, as the signal propagates lengthwise along the first coupling gap 145. As noted earlier, the racetrack resonant structure 130 may operate with a resonant frequency. The racetrack resonant structure 130 may thereby determine a frequency passband or a characteristic waveguide dispersion based on a central frequency. Thus, a first portion of the input light signal may couple into the racetrack resonant structure 130, whereas a second portion may continue unimpeded along the first coupling gap 145. The first portion of the input light signal may thereafter couple back or continue to propagate along the first coupling gap with a characteristic phase shift, including a phase shift of pi (pr). The racetrack resonant structure 130 may also be controlled to vary the resonant frequency. The device 100 may thus dynamically control a frequency passband, including electronically.

In block 550, the device outputs, by the directional coupler and based on the resonant frequency, a first portion of the input light signal to the first waveguide and a second portion of the input light signal to the second waveguide. For an example referencing FIG. 1, the device 100 outputs, by the directional coupler of waveguides 110 and 120 and based on the resonant frequency of the racetrack resonant structure 130, a first portion of the input light signal by the first waveguide 110 and a second portion of the input light signal by the second waveguide 120. In some such examples, a passband portion of the input light signal that corresponds to the frequency passb and is output by the first waveguide 110, and a remaining portion of the input light signal is output by the second waveguide 120. As discussed earlier, the racetrack resonant structure 130 may be positioned with respect to the first coupling gap 145 such that the imposed phase shift cancels, reverses, or otherwise modifies the coupling over the first coupling gap 145. For example, the racetrack resonant structure 130 is positioned symmetrically or at halfway with respect to the first coupling gap 145, to impose a phase shift of pi (Or) that undoes or reverses the coupling with respect to the prior length of the first coupling gap 145 as over the remaining length of the first coupling gap 145. The device 100 may thus perform switching of the input light signal by coupling to the racetrack resonant structure 130. In some such examples, the first portion coincides with the frequency passband of the racetrack resonant structure 130, whereas the second portion does not coincide with the frequency passband. The first portion output by the first waveguide 110 may be referred to as output in a bar state, whereas the second portion as output by the second waveguide 120 may be referred to as output in a cross state. In some such examples, one of the first portion or the second portion may be null, as when the input signal coincides in its entirety or in no portion with the frequency passband. The first portion may thereafter continue to propagate distinctly in the first waveguide 110, and the second portion may continue to propagate distinctly in the second waveguide 120. In general, the output of the device 100 may thus be characterized by a signal transfer function.

Figure 6:
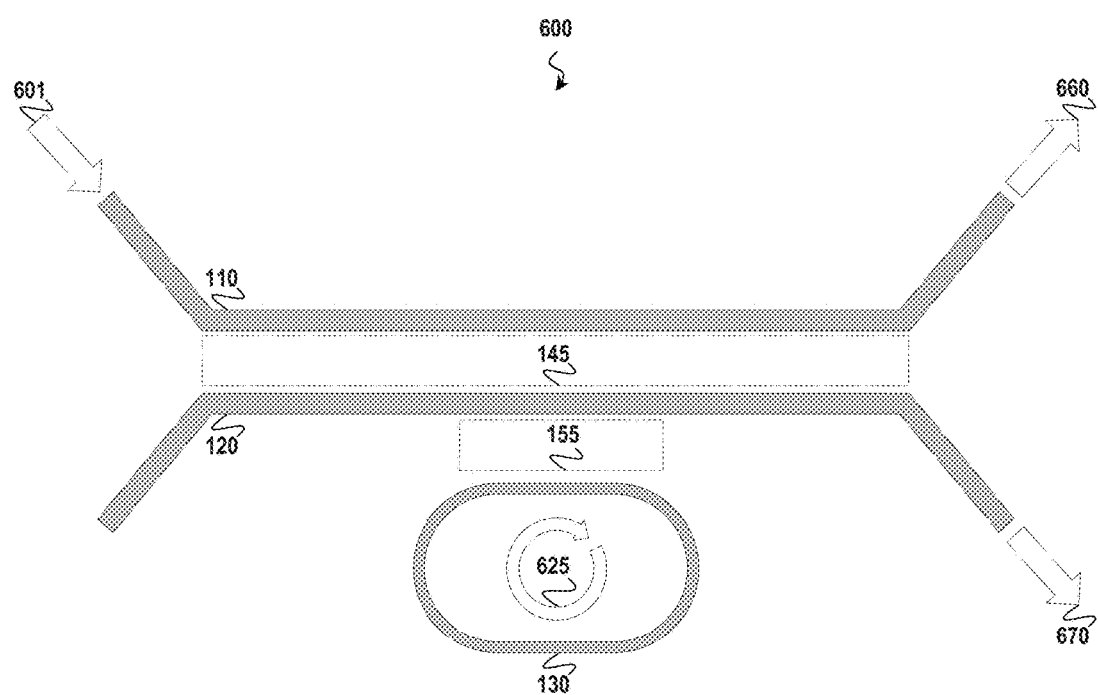
FIG. 6 is a block diagram of an optical switching device performing a method of optical switching, according to some examples of the present disclosure.

Further examples of optical switching are described with reference to FIG. 6. In that regard, FIG. 6 is a block diagram of an optical switching device 600 performing a method of optical switching, according to some examples of the present disclosure. The device 600 of FIG. 6 may be substantially similar to the device 100 of FIG. 1, as well as to other devices of the present disclosure. In particular, similarly numbered elements may be substantially similar to those of FIG. 1, including the waveguides 110 and 120, the racetrack resonant structure 130, the first coupling gap 145, and the second coupling gap 155. Arrows illustrated in FIG. 6 may be understood to illustrate a direction of propagation in the device 600, without limitation to designs of the device 600 or to performance of a suitable method. The method of switching performed by the optical switching device 600 may be substantially similar to the method 500 of FIG. 5, as well as to other methods of the present disclosure.

In particular, the device 600 may receive an input light signal 601 in the first waveguide 110 of a directional coupler. This may be performed in a manner substantially similar to block 502 of the method 500. The device 600 may couple the input light signal 601 in the first waveguide 110 to the second waveguide 120 of the directional coupler. This may be performed in a manner substantially similar to block 504 of the method 500. The device 600 may couple a portion 625 of the input light signal 601 in the directional coupler into the racetrack resonant structure 130. This may be performed in a manner substantially similar to block 506 of the method 500. The device 600 may thereby design that a first or passband portion 660 that corresponds to a frequency passband of the racetrack resonant structure 130 is output by the first waveguide 110 and a second or remaining portion 670 of the input light signal 601 is output by the second waveguide 120. This may be performed in a manner substantially similar to block 550 of the method 500. The first or passband portion 660 may be substantially similar to the portion 625 coupled into the racetrack resonant structure 130. Thus, the device 600 may perform optical switching by coupling between the directional coupler and the adjacent racetrack resonant structure 130. The racetrack resonant structure 130 may determine the frequency passband for switching. The device 600 may also dynamically control or reconfigure the frequency passband, including by electronic controls. As noted earlier, the first or passband portion 660 may coincide with the frequency passband as determined by the racetrack resonant structure 130; the second or remaining portion 660 may not coincide with the frequency passband. In several examples of the present disclosure, the device 600 thus performs the method 500 of optical switching for input light signal 601.

Figure 7A:
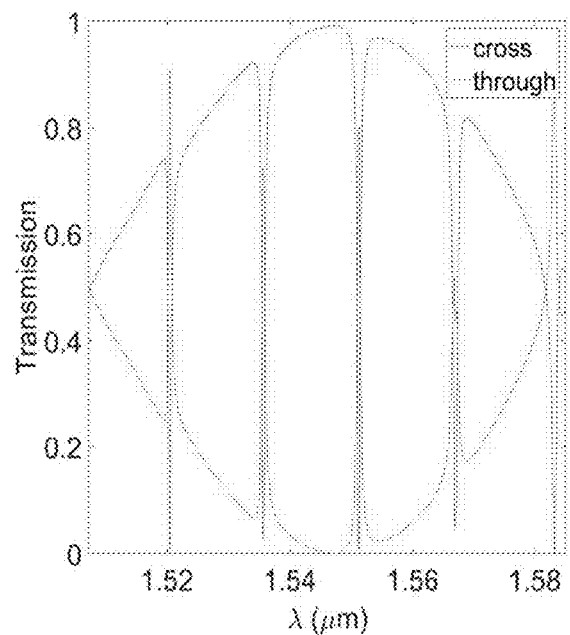
FIGS. 7A-7B are chart diagrams that simulate a signal transfer function for an optical switching device, according to some examples of the present disclosure.
Figure 7B:
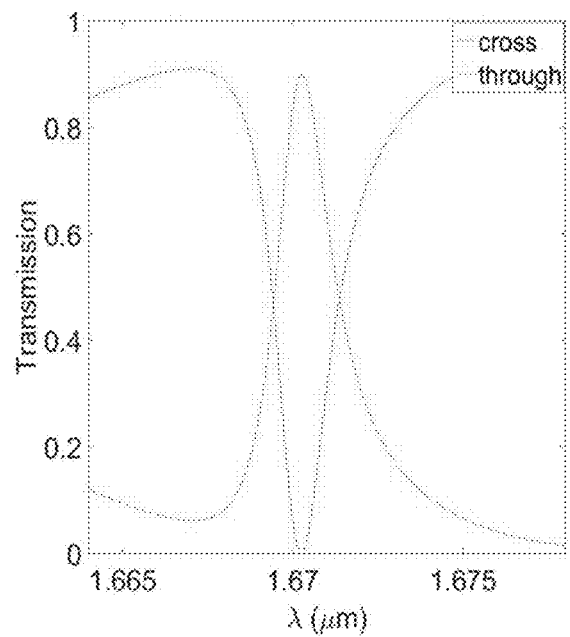

Further examples of optical switching according to the present disclosure are described with reference to FIGS. 7A-7B. In that regard, FIGS. 7A-7B are chart diagrams that simulate a signal transfer function for an optical switching device, according to some examples of the present disclosure. In particular, FIG. 7A charts the signal transfer function over a larger wavelength scale; and FIG. 7B charts the signal transfer function over a smaller wavelength scale. FIGS. 7A-7B may be understood to refer to or characterize any or all of the device 100 of FIG. 1, device 200 of FIG. 2, device 300 of FIG. 3, device 600 of FIG. 6, or any other suitable optical switching device. FIGS. 7A-7B may also be understood with reference to a particular frequency passband, whereas a device may vary frequency passbands as noted. In particular, FIGS. 7A-7B display the respective wavelength scale in micrometers (μm) of wavelength λ for the input light signal as referenced above. The charts distinguish output in the through or bar state from output in the cross state respectively, as discussed earlier, wherein the two output portions may account for substantially all of the input signal. Thus the transmission scale of 0 to 1 may be understood to refer to the portion of the input light signal output in each respective state. Transmission values between 0 and 1 may refer to or characterize the dispersive effects of the switching via switching device. For purposes of clarity, the following discussion may refer to the device 100 of FIG. 1, without limitation.

In FIG. 7A, the signal transfer function may be understood to display recurring characteristics over a larger wavelength scale. As discussed above, the output in a through or bar state may occur when input wavelength is near or coincides with a resonant frequency. Such resonance may recur over a wavelength interval. For wavelengths far from resonance, including between such intervals, output may be substantially in a cross state. Thus, FIG. 7A illustrates the optical switching device performing a selective output switching by resonance. As illustrated, switching to bar state output may be designed to be quite specific to resonance.

In FIG. 7B, the signal transfer function may be understood to have particular dispersive effects for wavelengths relatively near to the frequency passband. In the illustrated example, the frequency passband is centered near to 1.67 μm. The center value may represent the resonant wavelength of the racetrack resonant structure 130. For this example, the device sensitivity is simulated to be sufficient to vary the output in the bar or through state between substantially 0 and substantially 1 within less than 0.005 μm variation in wavelength. Within less than the 0.005 μm to 1.67 a frequency passband may output mostly in the bar state. The design of a device may affect, modify, or vary this signal transfer function, including the width and symmetry of the frequency passband and other dispersive effects of the switching.

Figure 8A:
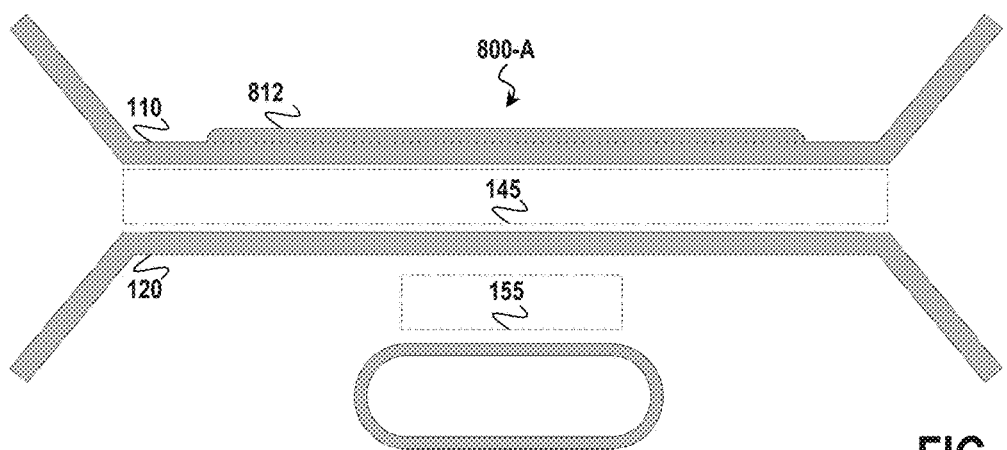
FIGS. 8A-8C are block diagrams of an optical switching device that includes a region of modified waveguide width, according to some examples of the present disclosure.
Figure 8B:
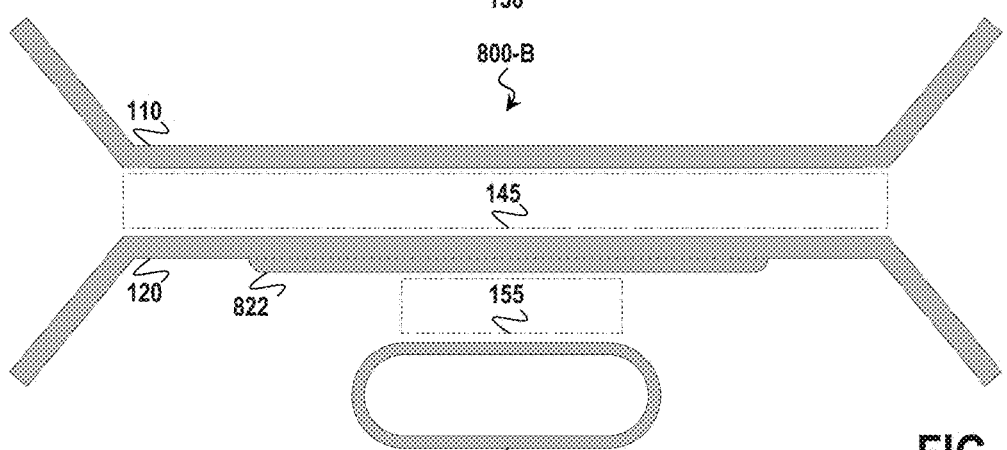
Figure 8C:
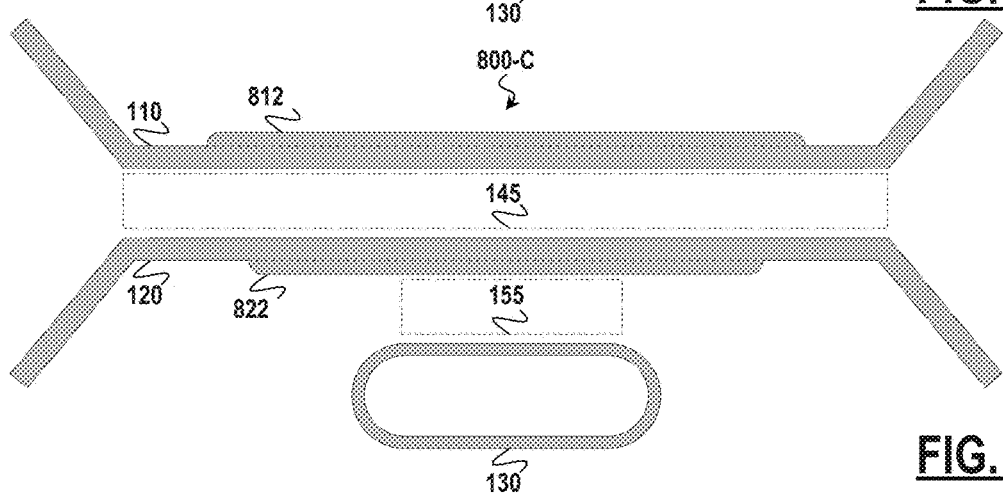

Further examples of a device for optical switching are described in detail with reference to FIGS. 8A-8C. In that regard, FIGS. 8A-8C are block diagrams of an optical switching device 800A-C that includes a region of modified waveguide width 812 or 822, according to some examples of the present disclosure. In particular, FIG. 8A illustrates the device 800-A with a region of modified waveguide width 812 for the first waveguide 110; FIG. 8B illustrates the device 800-B with a region of modified waveguide width 822 for the second waveguide 120; and FIG. 8C illustrates the device 800-C with a region of modified width 812 for the first waveguide 110 and a region of modified waveguide width 822 for the second waveguide 120. Elements of the devices 800A-C may be substantially similar to those of the device 100 of FIG. 1. In particular, similarly numbered elements may be similar or identical to elements of FIG. 1 as described in the above, including waveguides 110 and 120, racetrack resonant structure 130, first coupling gap 145, and second coupling gap 155.

In several examples of the present disclosure, a region of modified waveguide width 812 or 822 is designed on one of the waveguides 110 or 120 in a position near, adjacent to, or along the length of the second coupling gap 155. In several such examples, the modified region 812 or 822 is also designed to have shorter length than the first coupling gap 145, as illustrated in FIGS. 8A-8C. The relative dimensions of the modified region 812 or 822 are illustrative, without limiting a particular design parameter of the devices 800A-

C. Thus, the designs of the waveguides 110 or 120 may determine the characteristics of the respective modified regions 812 or 822. For purposes of characterization, the modified regions 812, 822 may be referred to as a continuous region with a particular length and a particular width, as represented in the devices 800A-C via dotted line relative to the respective waveguides 110, 120 or to respective waveguide widths of the waveguides 110, 120 along the length of the first coupling gap 145. Finally, while FIGS. 8A-8C illustrate the modified region 812 and the modified region 822 as like areas, it may be understood that the modified region 812 and the modified region 822 may likewise be dissimilar, non-symmetric, or otherwise distinct in dimensionality or other characteristics. As illustrated in FIG. 8C, the modified regions 812 and 822 may be distinct in their length, for example such that modified region 822 is shorter than modified region 812 or vice versa. Designs of the lengths and widths of either of the modified regions 812, 822 may impact, vary, or characterize switching in devices 800A-C.

In several examples of the present disclosure, the modified region 812 or 822 includes a slight increase in width for the waveguide 110 or 120 near, along to, or adjacent to the second coupling gap 155. Such a design may tend to impact, vary, or characterize the output or switching performed by the devices 800A-C, including dispersive or additional characteristics of the respective signal transfer functions as noted. For example, the modified regions 812, 822 may enable more rapid variation in switching output relative to input wavelength. The modified regions 812, 822 may also facilitate, enable, or result in a lower electrical or voltage variation to modify, configure, or else control the racetrack resonant structure 130 in operation of devices 800A-C. Devices 800A-C may thus operate with less power use or more efficiency. Designs may also select for signal transfer functions.

Figure 9A:
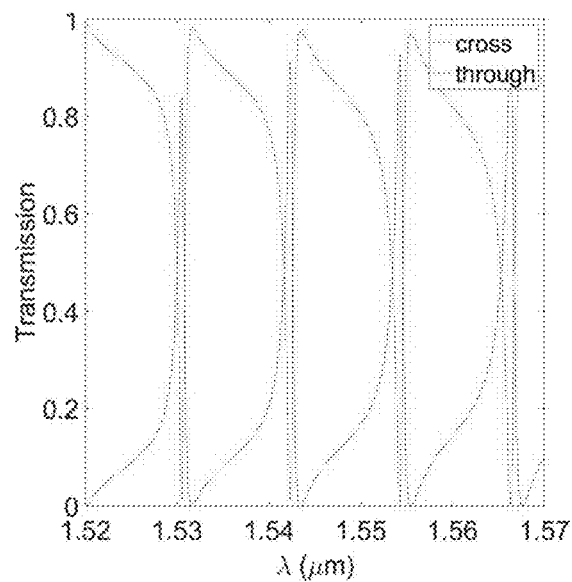
FIGS. 9A-9B are chart diagrams that simulate a signal transfer function for an optical switching device that includes a region of modified waveguide width, according to some examples of the present disclosure.
Figure 9B:
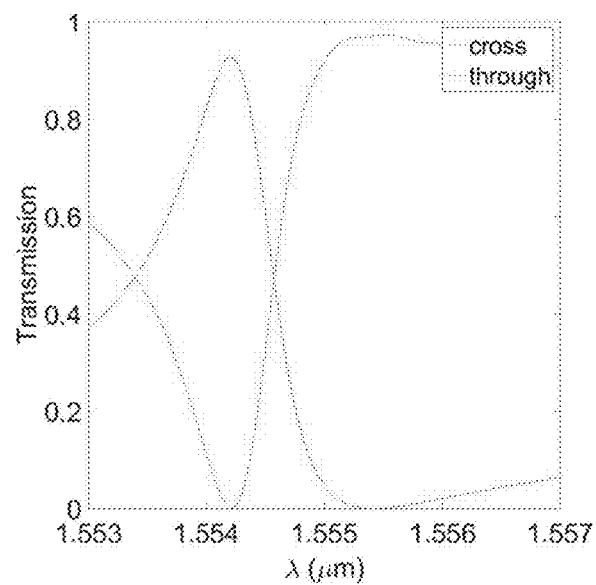

Further examples of optical switching according to the present disclosure are described with reference to FIGS. 9A-9B. In that regard, FIGS. 9A-9B are chart diagrams that simulate a signal transfer function for an optical switching device that includes a region of modified waveguide width, according to some examples of the present disclosure. In particular, FIG. 9A charts the signal transfer function over a larger wavelength scale; and FIG. 9B charts the signal transfer function over a smaller wavelength scale. FIGS. 9A-9B may be understood to refer to or characterize any or all of devices 800A-C of FIGS. 8A-8C or any other suitable optical switching device. FIGS. 9A-9B may also be understood with reference to a particular frequency passband, whereas such a device may control or vary the frequency passband as noted. In particular, FIGS. 9A-9B display the respective wavelength scale in micrometers (μm) of wavelength λ for the input light signal as referenced above. The charts distinguish output in the through or bar state from output in the cross state respectively, as discussed earlier, wherein the two output portions may account for substantially all of the input signal. Thus the transmission scale of 0 to 1 may be understood to refer to the portion of the input light signal output in each respective state. Transmission values between 0 and 1 may refer to or characterize dispersive effects of switching by the optical switching device.

In general, FIGS. 9A-9B may display charts similar or comparable to FIGS. 7A-7B. In particular, FIG. 9A may be understood to illustrate recurring characteristics over a larger wavelength scale, as comparable to FIG. 7A. In contrast to FIG. 7A, FIG. 9A may be understood to indicate a more rapid variation in switching relative to input wavelength, as indicated by a smaller wavelength interval in micrometers (μm) of wavelength λ for the input light signal as referenced above. Further, the frequency passband may be extended in shape. Thus, designs of a region of modified waveguide width may modify switching characteristics.

Likewise, FIG. 9B may be understood to illustrate particular dispersive effects for wavelengths relative to the frequency passband. In contrast to FIG. 7B, FIG. 9B may be understood to indicate that output may substantially remain in the through or bar state due to an extended shape of the frequency passband over the smaller wavelength intervals between resonance. As illustrated, switching to a bar state output may be designed to be less specific to resonance than in FIGS. 7A-7B. Devices 900A-C may thus operate with less power usage or may perform relatively more efficient switching by such designs. Designs may also select for a particular signal transfer function, as indicated between FIGS. 7A-7B and FIGS. 9A-9B.

Figure 10:
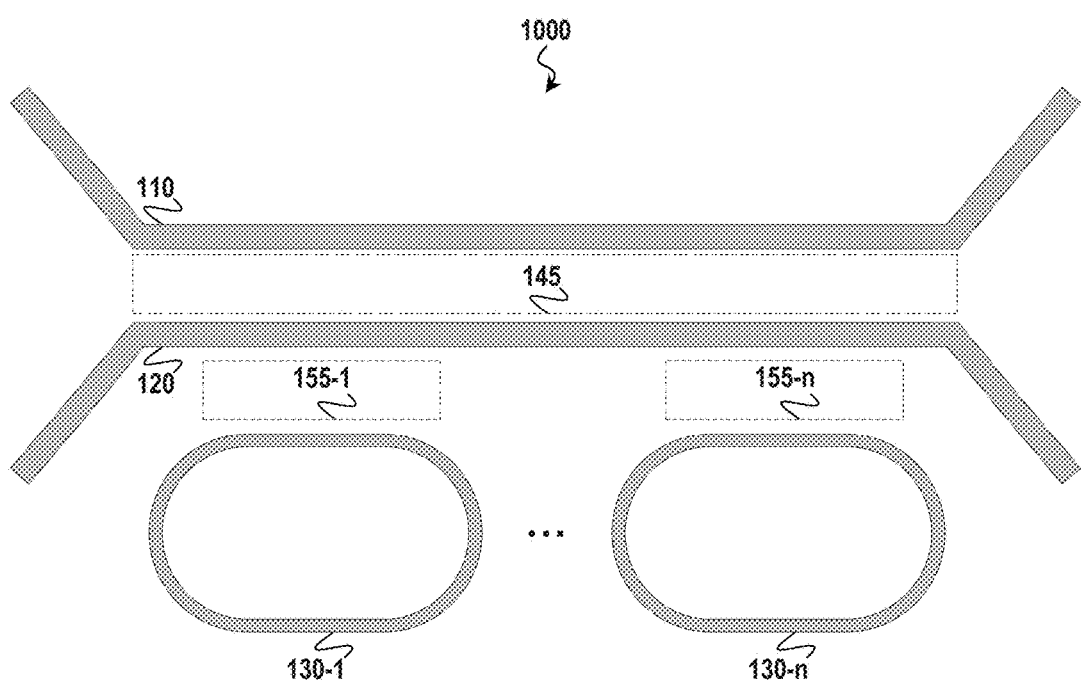
FIG. 10 is a block diagram of a system for optical switching that includes a set of adjacent racetrack resonant structures, according to some examples of the present disclosure.

Further examples of a device for optical switching are described in detail with reference to FIG. 10. In that regard, FIG. 10 is a block diagram of a system for optical switching 1000 that includes a set of adjacent racetrack resonant structures 130-1 through 103-n, according to some examples of the present disclosure. The system 1000 of FIG. 10 may be substantially similar to the device 100 of FIG. 1. In particular, similarly numbered elements may be substantially similar to those of FIG. 1 as described in the above, including the waveguides 110 and 120, the first coupling gap 145, the racetrack resonant structures 130-1 through 130-n, and the second coupling gaps 155-1 through 155-n. In the example of n=1, the system 1000 of FIG. 10 has one racetrack resonant structure 130-1 and one second coupling gap 155-1, such that it may be substantially equivalent to the device 100 of FIG. 1. However, FIG. 10 may be understood to illustrate the system 1000 for any integer value n of racetrack resonant structures 1 to n and second coupling gaps 1 to n. Furthermore, while racetrack resonant structures 130-1 and 130-n and second coupling gaps 155-1 and 155-n are illustrated as similar, device 1000 may be understood to allow likewise for elements to be suitably dissimilar, non-symmetric, or otherwise distinct in dimensionality or characteristic, without limitation as to a particular design parameter of the device 1000. As discussed with respect to FIG. 1, design variations may include modifications to any of the symmetries, shapes, widths, and/or spacings for either the waveguides 110 and 120 or each of the racetrack resonant structures 130, including non-planar or multi-planar designs without limitation, so long as each racetrack resonant structure 130 of the set is suitably positioned to enable a suitable coupling between the first coupling gap 145 and the respective second coupling gap 155, as described in prior detail with reference to racetrack resonant structure 130 in FIG. 1.

Referring to system 1000 of FIG. 10, the first waveguide 110 is positioned to enable an input light signal to couple from the first waveguide 110 to the second waveguide 120 through the first coupling gap 145 and over a coupling length between the first waveguide 110 and the second waveguide 120. Each racetrack resonant structure 130 is positioned along the coupling length of the first coupling gap 145 to enable the input light signal to couple from one of the first waveguide 110 and the second waveguide 120, such that a second set of coupling gaps 155 corresponds to the first set of racetrack resonant structures 130. Further, each racetrack resonant structure 130 is positioned adjacent to one of the first waveguide 110 and the second waveguide 120 over the coupling length of the first coupling gap 145, such that each coupling gap 155 is respectively positioned adjacent to the first coupling gap 145.

In some examples, the set of racetrack resonant structures 130 is substantially shorter in length relative to the first coupling gap 145. In some examples, the set of racetrack resonant structures 130 is positioned symmetrically or near to midway relative to the length of the first coupling gap 145, such that the set of coupling gaps 155 is likewise positioned symmetrically. As discussed in prior detail with reference to FIG. 1, based on positioning each of the racetrack resonant structures 130 may determine a frequency passband for a corresponding portion of the input light signal, so as to switch the output as between the first waveguide 110 and the second waveguide 120. Each of the racetrack resonant structures 130 may determine a distinct or separate frequency passband, such that a passband portion of the overall output of the device 1000 may correspond to a set of respective frequency passbands. Thus, the switching system 1000 may be designed to perform high-radix optical switching. As with the device 100 of FIG. 1, the system 1000 of FIG. 10 may be characterized by a signal transfer function. Variations in the design of the system 1000 may affect, modify, or vary characteristics of switching, including dispersive effects of the signal transfer function.

Figure 11:
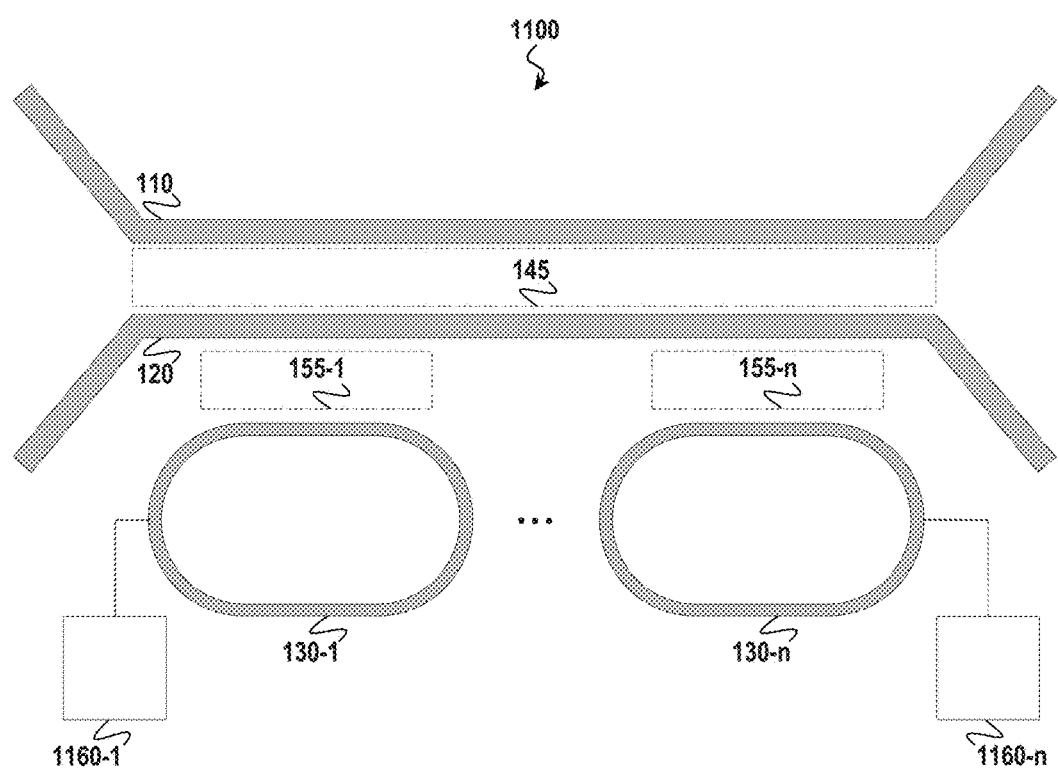
FIG. 11 is a block diagram of a system for optical switching that includes a set of electronic controls, according to some examples of the present disclosure.

Further examples are described in detail with reference to FIG. 11. In that regard, FIG. 11 is a block diagram of an optical switching device 1100 that includes a set of electronic controls 1160-1 through 1160-*n*, according to some examples of the present disclosure. The optical switching device 1100 may be substantially similar to the optical switching device 1000 of FIG. 10. In particular, similarly numbered elements may be substantially similar to those of FIG. 10, including the waveguides 110 and 120, the first coupling gap 145, the racetrack resonant structures 130-1 through 130-*n*, and the second coupling gaps 155-1 through 155-*n*. In several examples of the present disclosure, each electronic control 1160 varies the frequency passband of the respective racetrack resonant structure 130. The electronic control 1160 may vary a parameter of the respective racetrack resonant structure 130 such as a voltage or a temperature parameter, as discussed earlier with respect to FIG. 3. The electronic controls 1160 may enable rapid reconfiguration of switching parameters. Thus, switching by the device 1100 may again be reconfigurable on the order of picoseconds (ps). As with device 300 of FIG. 3, the electronic controls 1160 of FIG. 11 may include control logic and/or digital logic in any combination of hardware and/or software designs, including with complimentary metal-oxide semiconductor (CMOS) technologies, integrated chip (IC) or application-specific integrated circuit (ASIC) designs, a controller or microcontroller, or any other suitable electronic control technology that may be used to vary, modify, or otherwise control a parameter of a racetrack resonant structure 130. While electronic controls 1160-1 and 1160-*n* are illustrated as similar in FIG. 11, device 1100 may be understood to allow likewise for any electrical controls 1160 to be suitably dissimilar, non-symmetric, or otherwise distinct in dimensionality, connections, or other characteristics, without limitation as to a particular design parameter or control functionality for device 1100.

Figure 12:
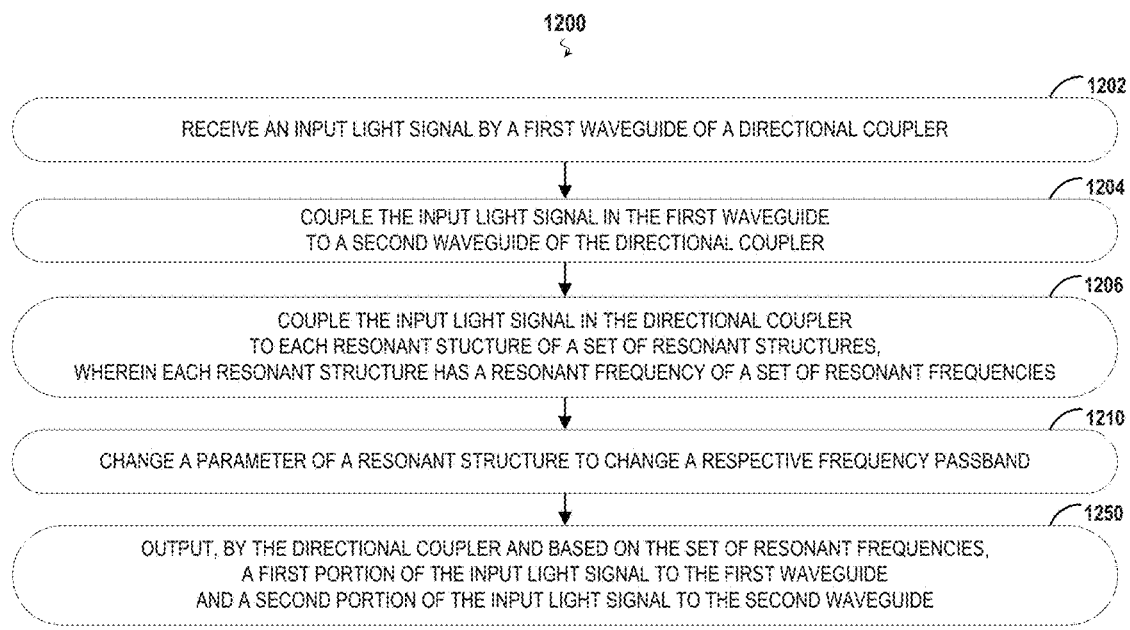
FIG. 12 is a flow diagram of a method of performing optical switching with a set of adjacent racetrack resonant structures, according to some examples of the present disclosure.

Further examples for implementing optical switching in accordance with the present disclosure are discussed in detail with reference to FIG. 12. In that regard, FIG. 12 is a flow diagram of a method 1200 of performing optical switching with a set of adjacent racetrack resonant structures, according to some examples of the present disclosure.

As noted with respect to method 500 of FIG. 5, the description of method 1200 may be understood to be non-limiting. Blocks may be added to or omitted from the method 1200 without departing from the scope of the present disclosure. Unless otherwise noted, blocks of the method 1200 may be performed in any order, including simultaneously or concurrently by one or more device elements. In general, the method 1200 is equally suitable for performance using the devices FIG. 1, 2, 3, 6, 8A-8C, 10, or 11, as well as any other suitable switching device. For purposes of clarity, the discussion may refer to device 1000 of FIG. 10, without limitation.

Blocks 1202, 1204, 1206, and 1250 of the method 1200 may each correspond with substantial similarity to the blocks 502, 504, 506, and 550 respectively of the method 500 as described in the above. In block 1202, the system receives an input light signal by a first waveguide of a directional coupler. This may be performed substantially as described in block 502 of FIG. 5 and with reference to the first waveguide 110 of FIG. 10. In block 1204, the system couples the input light signal in the first waveguide to a second waveguide of the directional coupler. This may be performed substantially as described in block 504 of FIG. 5 and with reference to the second waveguide 120 of FIG. 10.

In block 1206, the system couples the input light signal in the directional coupler to each racetrack resonant structure of a set of racetrack resonant structures, wherein each resonant structure has a resonant frequency of a set of resonant frequencies. This may be performed substantially as described in block 506 of FIG. 5 and with respect to each racetrack resonant structure 130 of FIG. 10. In particular, the system 1000 may repeat block 506 of the method 500 with each racetrack resonant structure 130 as the input light signal propagates along the length of the first coupling gap 145 as in FIG. 10, from the racetrack resonant structure 130-1 and past the racetrack resonant structure 130-*n*. Thus with reference to FIG. 6, the system 1000 may couple a respective portion 625 into each racetrack resonant structure 130 of the set, wherein some such portions may be null insofar as the input light signal does not coincide with the respective frequency passband or the resonant frequency. By such repetition, the system 1000 may perform selective switching for a set of frequency passbands that define a passband portion of output with respect to the input light signal. In some examples wherein multiple racetrack resonant structures 130 have similar or identical passband frequencies, a similar or identical portion 625 of the propagating signal may couple into multiple racetrack resonant structures 130 and result in a modified or distinct phase shift. As discussed, a remaining portion of the signal may still continue unimpeded or unaffected.

In block 1210, the system changes at least one parameter for one racetrack resonant structure 130 to change at least one frequency passband. This may be performed substantially as described with respect to the control mechanism 360 of FIG. 3 or the electronic controls 1160 of FIG. 11. The system 1000 may thereby vary, control, or modify one or more of the racetrack resonant structures 130 dynamically for rapid reconfiguration of switching. They system 1000 may independently control each or any of the racetrack resonant structures 130. Variation in the set of frequency passbands may define the passband portion of output, e.g. that portion output in bar state by the first waveguide instead of by the second waveguide. As noted, such a passband portion may correspond to a set of multiple frequency passbands. Thus, a larger number of racetrack resonant structures 130 may allow controls over relatively more frequency passbands. This may facilitate more control over the signal transfer function.

In block 1250, the system outputs a first or passband portion of the input light signal by the first waveguide and a second or remaining portion by the second waveguide. This may be performed substantially as described in block 550 of FIG. 5 and with reference to the first portion 660 and the second portion 670 as described above with respect to FIG. 6. As noted, the passband portion may be a set of frequency passbands, as defined in the system. Such a system as in FIG. 10 may thus perform the method 1200 to switch an input light signal.

Figure 13A:
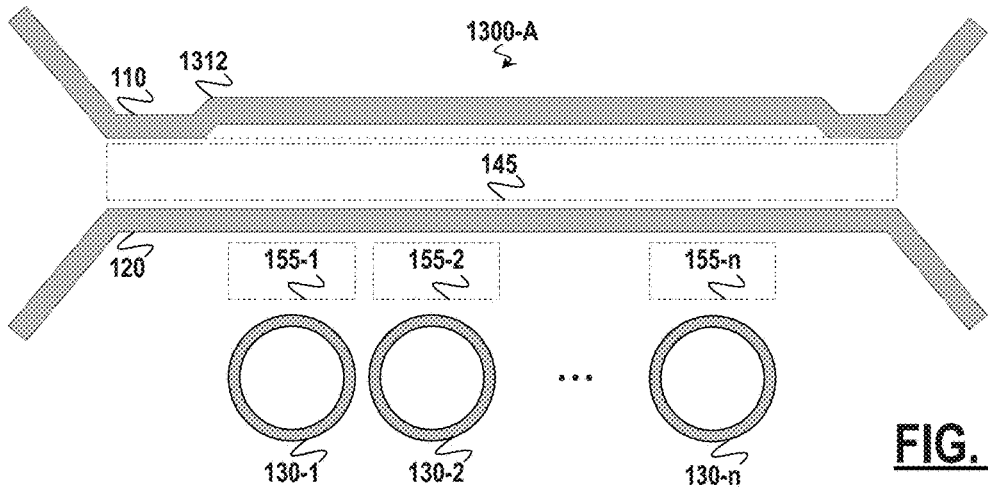
FIGS. 13A-13C are block diagrams of a system for optical switching that includes a region of modified coupling width, according to some examples of the present disclosure.
Figure 13B:
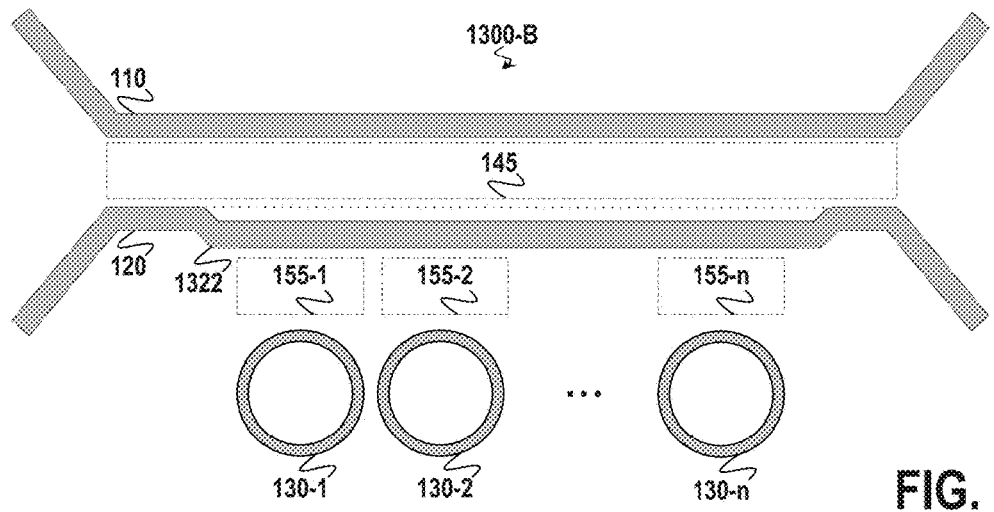
Figure 13C:
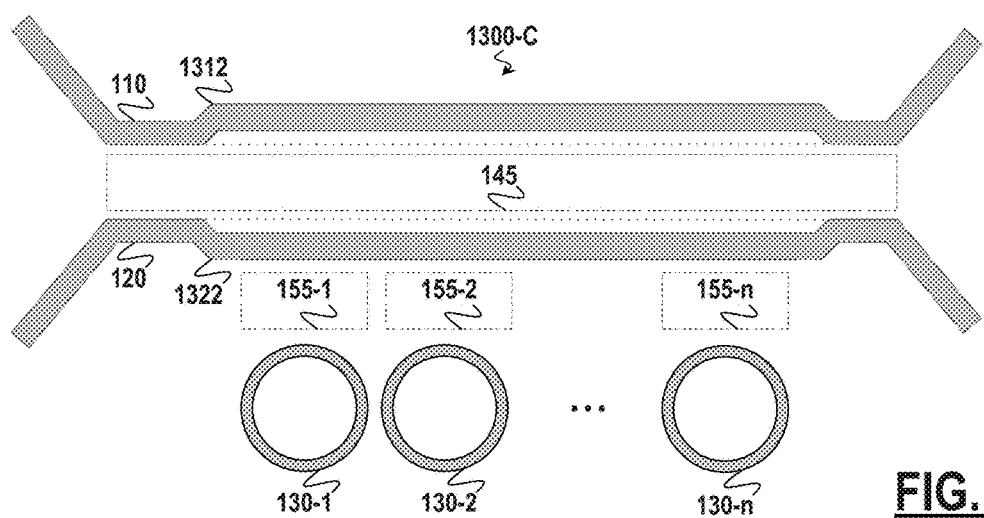

Further examples of a system for optical switching are described in detail with reference to FIGS. 13A-13C. In that regard, FIGS. 13A-13C are block diagrams of an optical switching system 1300A-C that includes a region of modified coupling width 1312 or 1322, according to some examples of the present disclosure. In particular, FIG. 13A illustrates the system 1300-A with a region of modified coupling width 1312 in the first waveguide 110; FIG. 13B illustrates the system 1300-B with a region of modified coupling width 1322 in the second waveguide 120; and FIG. 8C illustrates the system 1300-C with a region of modified width 1312 in the first waveguide 110 as well as a region of modified waveguide width 1322 in the second waveguide 120. Elements of the systems 1300A-C may be substantially similar to those of the system 1000 of FIG. 10. In particular, similarly numbered elements may be substantially similar or identical to elements of FIG. 10 as described in the above, including the waveguides 110 and 120, the first coupling gap 145, the set of racetrack resonant structures 130-1 through 130-n, and the set of second coupling gaps 155-1 through 155-n.

In several examples of the present disclosure, a region of modified coupling width 1312 or 1322 is designed in one of the waveguides 110 or 120 in a position near, adjacent to, or along the length of the set of second coupling gaps 155. In several such examples, the modified region 1312 or 1322 is also designed to have a shorter length than the first coupling gap 145, as illustrated in FIGS. 13A-13C. The relative dimensions of the modified region 1312 or 1322 are illustrative, without limiting a particular design parameter of the devices 1300A-C. Thus, the designs of the waveguides 110 or 120 may determine the characteristics of the respective modified regions 1312, 1322. For purposes of characterization, the modified regions 1312, 1322 may be referred to as a continuous region with a particular length and a particular width, as represented in the devices 1300A-C via dotted line relative to the respective waveguides 110, 120 or to a respective coupling width of the first coupling gap 145. Finally, while FIGS. 13A-13C illustrate the modified region 1312 and the modified region 1322 as like areas, it may be understood that the modified region 1312 and the modified region 1322 may likewise be dissimilar, non-symmetric, or otherwise distinct in dimensionality or other characteristics. As illustrated in FIG. 13C, the modified regions 1312 and 1322 may be distinct in their length, for example such that the modified region 1322 is shorter than the modified region 1312 or vice versa. Designs of the lengths and widths of either of the modified regions 1312 or 1322 may impact, vary, or characterize switching parameters in devices 1300A-C.

In several examples of the present disclosure, the modified region 1312 or 1322 includes a slight increase in width for the first coupling gap 145 near, along to, or adjacent to the set of second coupling gaps 155. For example, the first coupling gap 145 between the waveguides 110, 120 may thus be increased to a few micrometers (µm) in its overall width. Notably, such designs maintain the waveguides 110, 120 in proximity relative to their coupling distance, as in a directional coupler. For example, common-mode fabrication errors continue to dominate over total fabrication error in the devices 1300A-C. Thus, the waveguides 110 and 120 do not include additional elements such as phase shifters to correct for phase variations based on the separation. This design is in contrast, for example, to a ring-assisted Mach-Zehnder Interferometer (MZI), where use of notably wider separation between waveguides may introduce design complexities to ensure suitable phase alignments.

These designs of FIGS. 13A-13C may tend to impact, vary, or characterize the output or switching performed by the devices 1300A-C, including in dispersive or additional characteristics of the respective signal transfer functions as discussed above. For example, the modified regions 1312, 1322 may facilitate, enable, or result in allowing device designs to position the set of racetrack resonant structures 130 with more flexibility relative to the first coupling gap 145, including use of less central positions, nearer to the edges of its length, or less symmetric placements. This may also allow an increase in the number of racetrack resonant structures 130 relative to a particular or fixed length of the first coupling gap 145. For example, the modified regions 1312, 1322 may also facilitate, enable, or result in designs with improved wavelength-selective switching, by improving upon the independence of each racetrack resonant structure 130 or by lowering interference between frequency passbands or resonant frequencies. This may allow the devices 900A-C to modify, configure, or control effects of each racetrack resonant structure 130 more independently during device operation. Devices 900A-C may thus operate with more efficient, reliable, or selective optical switching. Such design variations may also facilitate any particular or desirable signal transfer function.

The elements of FIGS. 13A-13C may be similarly combined or implemented in other suitable device designs of the present disclosure. In particular, the modified coupling regions 1312, 1322 may be suitable for use in the example devices of FIG. 1, 2, 3, 6, 8A-8C, 10, or 11, and may devices 1300A-C may perform any or all blocks of the method 500 of FIG. 5 or the method 1200 of FIG. 12. Similarly, elements of the FIGS. 8A-8C may be combined or implemented in other suitable device designs of the present disclosure, including FIGS. 13A-13C and others. Thus, in some example devices of the present disclosure, designs implement both of one or more regions of modified waveguide width 812, 822 and one or more regions of modified coupling width 1312, 1322. Such elements may be defined by the waveguide design, as noted. The combined effects of such additional design elements on any such device may further vary, modify, characterize or improve on switching by the device.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. An optical switching device, comprising:
a first waveguide, to receive an input light signal;

a second waveguide, positioned to enable the input light signal to couple between the first waveguide and the second waveguide through a first coupling gap; and a racetrack resonant structure, positioned adjacent to the first coupling gap to enable the input light signal to couple between one of the first waveguide and the second waveguide and the racetrack resonant structure through a second coupling gap;

wherein the racetrack resonant structure is to determine a frequency passband, such that a first portion of the input light signal that coincides with the frequency passband is output by the first waveguide, and a second portion of the input light signal that does not coincide with the frequency passband is output by the second waveguide.

2. The device of claim 1, wherein:

the first coupling gap is such that when the input light signal does not coincide with the frequency passband, the optical switching device is to output the input light signal by the second waveguide.

3. The device of claim 1, wherein:

the second coupling gap is such that the racetrack resonant structure is overcoupled with respect to one of the first waveguide and the second waveguide.

4. The device of claim 1, wherein:

the racetrack resonant structure is positioned symmetrically with respect to the first coupling gap, such that the second coupling gap is positioned symmetrically with respect to a length of the first coupling gap.

5. The device of claim 1, including:

an electronic control mechanism to vary the frequency passband of the racetrack resonant structure.

6. The device of claim 1, wherein:

one of the first waveguide and the second waveguide includes a region of modified waveguide width, adjacent to the first coupling gap and the second coupling gap.

7. A system for optical switching, comprising:

a first waveguide, positioned to enable an input light signal to couple from the first waveguide to a second waveguide through a first coupling gap and over a coupling length between the first waveguide and the second waveguide; and a first set of racetrack resonant structures, wherein each racetrack resonant structure of the first set is positioned along the coupling length to enable the input light signal to couple from one of the first waveguide and the second waveguide, such that a second set of coupling gaps corresponds to the first set of racetrack resonant structures;

wherein each racetrack resonant structure of the first set is positioned adjacent to one of the first waveguide and the second waveguide over the coupling length, such that each coupling gap of the second set is positioned adjacent to the first coupling gap.

8. The system of claim 7, wherein:

each racetrack resonant structure of the first set is to determine a corresponding frequency passband of a corresponding portion of the input light signal that is output by one of the first waveguide and the second waveguide.

9. The system of claim 7, wherein:

the first set of racetrack resonant structures is positioned symmetrically with respect to the coupling length of the first coupling gap, such that the second set of coupling gaps is positioned symmetrically with respect to the coupling length.

10. The system of claim 7, wherein:

each racetrack resonant structure of the first set is controlled electronically to vary a corresponding frequency passband.

11. The system of claim 7, wherein:

the first coupling gap includes a region of modified coupling width between the first waveguide and the second waveguide, adjacent to a coupling gap of the second set.

12. A method of optical switching, comprising:

receiving an input light signal by a first waveguide of a directional coupler;

coupling the input light signal in the first waveguide to a second waveguide of the direction coupler;

coupling the input light signal in the directional coupler to a racetrack resonant structure that is positioned adjacent to the directional coupler, such that a passband portion of the input light signal that corresponds to a frequency passband of the racetrack resonant structure is output by the first waveguide and a remaining portion of the input light signal is output by the second waveguide; and changing the frequency passband of the racetrack resonant structure by varying a parameter of the racetrack resonant structure.

13. The method of claim 12, including:

coupling the input light signal to additional racetrack resonant structures positioned to enable coupling from the directional coupler of corresponding frequency passbands.

14. The method of claim 13, including:

changing a corresponding frequency passband of an additional racetrack resonant structure independently of other frequency passbands, such that the passband portion output by the first waveguide corresponds to a set of multiple frequency passbands.

* * * * *